United States Patent [19]
Schwartz et al.

[11] Patent Number: 5,828,483
[45] Date of Patent: *Oct. 27, 1998

[54] PRINTING AND INSPECTION SYSTEM USING ROTATING POLYGON AND OPTICAL FIBERS

[76] Inventors: Nira Schwartz, 1314 Wellington Pl., Aberdeen, N.J. 07747; Arie Shahar, 14 David Street, Moshav Magshimim 56910, Israel

[*] Notice: The term of this patent shall not extend beyond the expiration date of Pat. No. 5,557,438.

[21] Appl. No.: 799,288

[22] Filed: Feb. 13, 1997

Related U.S. Application Data

[63] Continuation of Ser. No. 238,280, May 5, 1994, abandoned, which is a continuation-in-part of Ser. No. 155,889, Nov. 23, 1993, Pat. No. 5,557,438.

[51] Int. Cl.⁶ .................................................. G02B 26/08
[52] U.S. Cl. .................... 359/216; 359/204; 250/236; 347/243; 347/261
[58] Field of Search .................................... 359/196, 197, 359/201, 203, 204, 216, 217, 218, 219, 223, 226; 385/121; 250/236; 347/243, 259, 260, 261

[56] References Cited

U.S. PATENT DOCUMENTS

| | | | |
|---|---|---|---|
| 3,972,583 | 8/1976 | Lobb | 359/203 |
| 4,352,550 | 10/1982 | Uchida . | |
| 4,409,477 | 10/1983 | Carl . | |
| 4,413,878 | 11/1983 | Lettington | 359/203 |
| 4,702,552 | 10/1987 | Margolin | 385/121 |
| 5,155,790 | 10/1992 | Hwang | 385/121 |
| 5,187,606 | 2/1993 | Kondo et al. | 359/196 |

FOREIGN PATENT DOCUMENTS

| | | |
|---|---|---|
| 62-25722 | 2/1987 | Japan . |
| 3-261909 | 11/1991 | Japan . |
| 4-51111 | 2/1992 | Japan . |
| 4-70711 | 3/1992 | Japan . |

OTHER PUBLICATIONS

Philip J. Donald et al., "Rotating Mirror Assembly", RCA Technical Notes, TN #865, May 5, 1970.

*Primary Examiner*—Paul M. Dzierzinski
*Assistant Examiner*—Darren E. Schuberg
*Attorney, Agent, or Firm*—David Pressman

[57] ABSTRACT

A system for scanning or tracking, which includes a polygon rotatable about a rotational axis. The system further includes a fixed radiation source directing radiation at the polygon along a path whose extension would intersect the rotational axis of the polygon. The intersection of the extended path with the rotational axis of the polygon constitutes an original imaginary intersection point. The system includes a first scanned region onto which the radiation is projected, the projection being characterized in that radiation emanating from the radiation source is reflected from the polygon and is made to propagate, prior to impinging on the first scanned region, along a path which includes at least one additional path segment with the additional path segment passing through or directed at an additional intersection point, the additional intersection point being a real or imaginary image of the original intersection point. Finally, the system includes a bundle of radiation guides, such as optical fibers, which guide radiation between the first scanned region and a second scanned region remote from the first scanned region.

20 Claims, 7 Drawing Sheets

PRINTING AND INSPECTION SYSTEM USING ROTATING POLYGON AND OPTICAL FIBERS

This is a continuation of U.S. patent application Ser. No. 08/238,280, now abandoned, filed May 5, 1994, which is a continuation-in-part of U.S. patent application Ser. No. 08/155,889, now U.S. Pat. No. 5,557,438, filed Nov. 23, 1993.

FIELD AND BACKGROUND OF THE INVENTION

The present invention relates generally to the field of optics and in particular to optical polygons and optical fibers which are used to manipulate light beams for reading, writing, printing, plotting, engraving and inspecting various surfaces.

A wide variety of optical systems for scanning surfaces with light beams are known in the art. Some of these systems employ flat mirrors and others employ polygonal mirrors. Many of these systems are reading (or inspecting) machines which usually have a camera in a fixed position and wherein the information (the image) is transferred to the camera from different locations by a scanning mirror.

Other types of these systems are writing (printing plotting or engraving) machines. These have a design which is similar to that where a laser, mounted in a fixed position, puts out a writing beam which illuminates a scanning mirror which causes it to scan across a surface.

Examples of basic optical systems which will aid in understanding such scanning systems are shown in FIGS. 1–5, our above parent application.

Examples of more sophisticated scanning systems are also illustrated and discussed in the above-mentioned U.S. Patent application.

Certain of the examples appear, or are described, in our above parent application, which are incorporated herein in their entirety for all purposes as if fully set forth herein.

Figure 1:
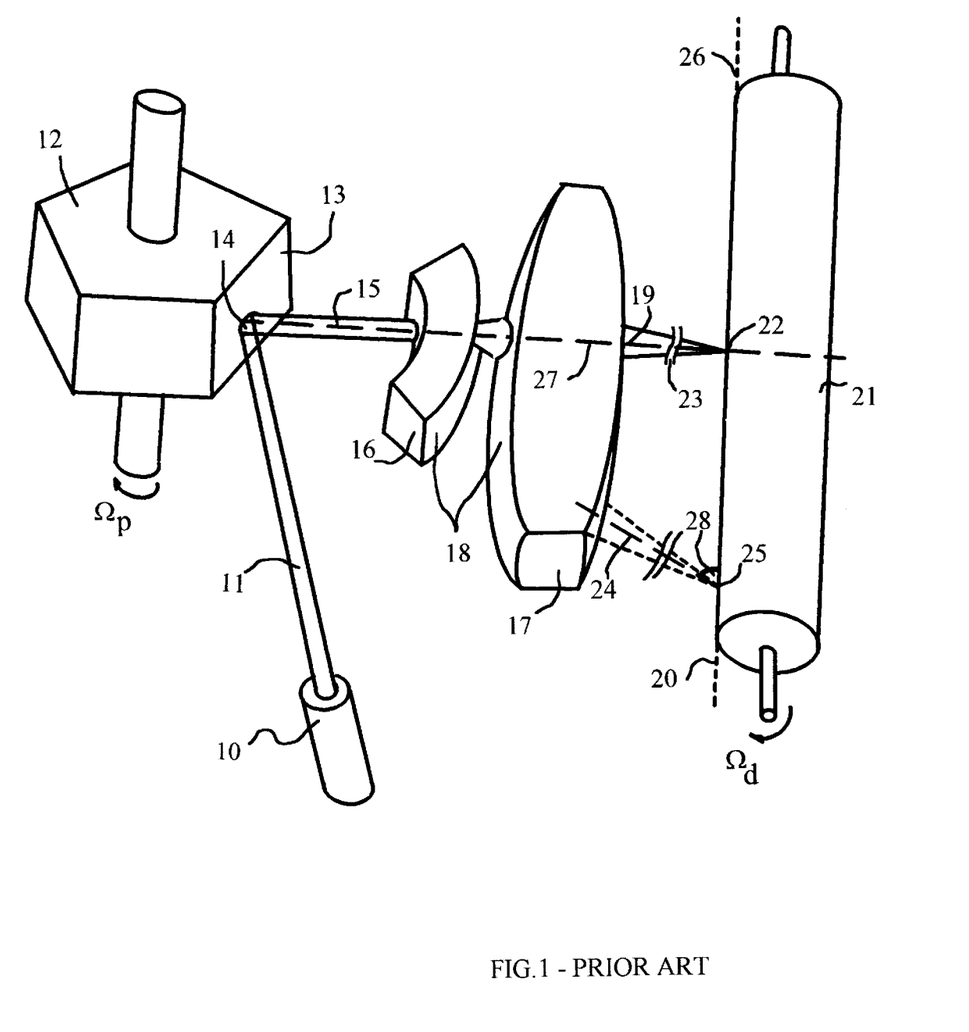
FIG. 1 illustrates a scanning system of conventional printer
Figure 2:
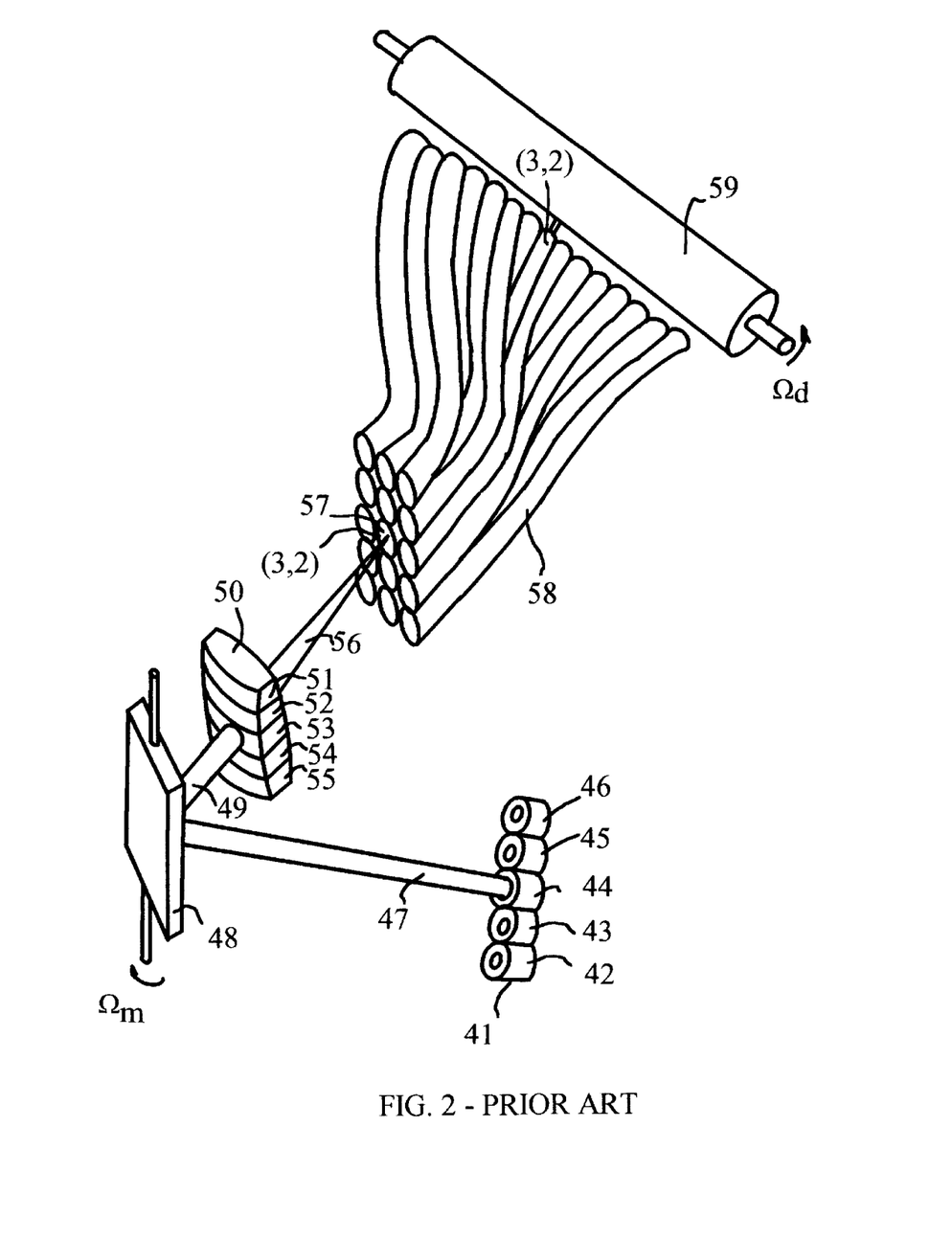
FIG. 2 shows an scanning system containing converting bundle of optical fibers.

FIGS. 1–2 are next described and serve as an introduction to the present invention and as indication of the state of known systems.

FIG. 1 SCANNING SYSTEM OF CONVENTIONAL PRINTER

The scanning system illustrated in FIG. 1 serves as the optical writing head of conventional printers. This system consists of a light source 10 which emits parallel radiation beam 11. Beam 11 is oriented toward a scanning polygon 12 and hits its facet 13 at a spot 14. Beam 11 is reflected from spot 14 as parallel scanning beam 15. Beam 15 passes through lenses 16 and 17. Lens 16 and 17 serve as a focusing lenses-system 18 which converts parallel beam 15 into focusing beam 19. Beam 19 is focused into a small spot on the effective focal plane 20 of lens-system 18. The surface of drum 21 and the effective focal plane 20 have a common line which serves as a scanning line 26. In this configuration, beam 19 is focused on the surface of drum 21 as spot 22 which is located on scanning line 26. Beam 19 is illustrated by a broken gap 23 for indicating that the distance between lens 17 and drum 21 is actually much bigger than illustrated.

When scanning polygon 12 rotates with angular velocity $\Omega_p$, scanning beam 15 changes its orientation according to the scan position of polygon 12 and focusing spot 22 slides along scanning line 26 on drum 21. When drum 21 also rotates with angular velocity $\Omega_d$, the combination of the sliding of spot 22 along scanning line 26 with the rotation of the surface of drum 21 results in a scan over the entire surface of drum 21.

Beam 24 which, is illustrated by a broken line, indicates another position of beam 19 corresponding to a situation when spot 22 slides to another position such as spot 25. Beam 24 and its focussing spot 25 correspond to another scan position of polygon 12 and scanning beam 15 which is not illustrated in the drawing. The width of the scanning range along scanning line 26 depends on the following parameters of the system and it increases with them:

(a) The scan angle α which is measured between the optical axis 27 of lens-system 18 and scanning beam 15 in its scanning position corresponding to the scan position of polygon 12.

(b) The effective focal length F of lens-system 18 which equals the distance between lens 17 and scanning line 26 on the surface of drum 21.

Increasing of a and F results in a wider scanning range along scanning line 26. However, the increases of a and F are limited due to the following reasons:

Increasing of α increases the parallax aberration of lens-system 18 and degrades the ability to focus spot 22 (or 25) into a small spot. Increasing of F degrades the ability to focus spot 22 (or 25) into a small spot due to the diffraction limit (Arry disk). In addition, increasing a increases angle 28 between the focussing beam 24 and the scanning line 26. The width of spot 25 is proportional to 1/cos (angle 28) which means that the width of spot 25 increases with angle 28 (or angle alpha). From the above listed reasons, it is clear that for maintaining high resolution (small spot 22 or 25), the value of scanning angle α and focal length F have to be limited to relatively small values. Although this system is the most intensively used today, the increasing demands for both high resolution and wide scan require other designs for scanning systems which will give the solutions for these demands.

An attempt to overcome the limitations of the system illustrated in FIG. 1 is represented by introducing the system illustrated in FIG. 2. The system of FIG. 2 solves some of the problems of the system of FIG. 1, but introduces other problems and actually converts some of the problems of the system illustrated in FIG. 1 into other type of problems as will be described in the discussion below.

FIG. 2 SCANNING SYSTEM WITH OPTICAL FIBERS

The scanning system illustrated in FIG. 2 is based on a technique of optical fibers which is well known. An array of light sources 41 consists of light sources 42–46 which emits several parallel radiation beams. (For simplicity of the drawing, only beam 47 which is emitted from light source 44 is illustrated). Parallel beam 47 hits flat mirror 48 and is reflected from there as parallel beam 49. Beam 49 passes through segment 53 of lens 50 and is converted by this segment into focusing beam 56. Lens 50 consists of five segments corresponding to five beams (similar to beam 49) which are emitted from the five light sources 42–46. Beam 56 is focused into a small spot at the input of optical fiber (3, 2).

All the inputs of the optical fibers are located in one plane and are arranged in a matrix format. The notation of each fiber is done according to a standard notation of the terms in a mathematical matrix (ij) where i is the number of the line and j is the number of the column. All the optical fibers (1, 1)–(5, 3) are collected in one bundle using a well known technique of converting the input arrangement of fibers at the entrance of the bundle into another arrangement of the fibers at the exit of the bundle.

In this specific case, the bundle 58 converts the matrix arrangement at its entrance into an array arrangement at its output. The conversion is done by transferring the matrix lines one by one in sequence which means that the fibers at the exit array of bundle 18 are arranged in the following order: (1,1)–(1,3), (2,1)–(2,3), (3,1)–(3,3), (4,1)–(4,3), (5,1)–(5,3).

When mirror 48 rotates back and forth, the five scanning beams such as beam 49 pass through lens 50 and are focused into the inputs of the fibers in the matrix entrance of the bundle like beam 56. Each of the five scanning beams scans along one of the matrix lines and is coupled to one of the fibers in this line which corresponds to the position of the vibrating mirror 48. During the vibration of mirror 48, the exit array of bundle 58 emits light on drum 59 from five fibers simultaneously and switches to the other five fibers. In this configuration, the scanning line which is formed on drum 59 by fiber array (1,1)–(5,3) consists of five scanning segments which are produced by the corresponding fibers (1,1)–(1,3), (2,1)–(2,3), (3,1)–(3,3), (4,1)–(4,3) and (5,1)–(5,3).

When mirror 48 vibrates back and forth with angular velocity $\Omega_m$ and drum 59 rotates with angular velocity $\Omega_d$ the scan by the exit array (1,1)–(5,3) of bundle 18 is done all over the surface of drum 59. The design of this system dramatically reduces the scan angle and reduces with it the parallax aberration. In addition, the radiation which is emitted from the exit array (1,1)–(5,3) upon drum 59 is concentrated in small spots (the active diameter of the fibers) and hits drum 19 after a short distance which does not allow the radiation to spread to a significant extent.

The above-mentioned advantages give this system the capability of producing a scan along a wide range and maintaining high resolution. The use of several light sources also increases the scan speed.

Although the use of bundle 58 reduces the parallax aberrations due to the decreasing of the scan angle, it introduces many other problems that are discussed below:

Bundle 58, which operates as a matrix to array converter, reduces scan angle dramatically. This angle is small not just because of the matrix to array conversion, but it also has an upper limit to its value. This upper limit is defined by the biggest angle that beams such as beam 56 can be oriented with respect to the fibers in the entrance matrix and still be coupled into the fibers in an efficient way. This upper limit is in the range of several degrees (approx. 6°). The maximum scanning angle of about 6° eliminates the possible use of a rotating polygon as scanning device in such system because a polygon of 360×(2/6)=120 facets is required and such polygon is impractical for use. For this reason, a vibrating mirror must be used.

A vibrating mirror such as mirror 48 has many disadvantages. Such a mirror has to vibrate very fast and introduces considerable vibration to the system which disturbs its operation. For such vibration velocities of mirror 48, it has to be driven by a resonator which operates at a self resonance frequency $\Omega_o$. An operation of the resonator at frequencies which are different from $\Omega_o$ causes a dramatic increase in vibrations which are transferred to the entire system and cause very strong disturbance which does not allow proper operation.

For these reasons the vibration frequency of mirror 48 has to equal $\Omega_o$ and actually cannot be adjusted. The scanning of mirror 48 which is done in high frequency can be produced for scanning only small angles which are even smaller than allowed by the above mentioned upper limit. In addition, due to the direction change of the rotation of mirror 48, its movement is not linear in the regions close to the turning points in which mirror 48 changes its direction of rotation. Since the system can be operated only in the range where there is a linear relationship between the time and the position of mirror 48, only a fraction of the scan angle can be used which results in a very small scanning angle. A very small scanning angle allows the use of relatively small numbers of optical fibers in each line of the entrance matrix of bundle 18. The number of lines in this matrix is given by the mathematical expression:

(number of fibers in the exit array) (number of fibers in each line of the entrance matrix).

It is clear from the above formula that when the number of fibers in each line of matrix is small, the number of lines in the matrix is large. The number of light sources equals the number of lines in the matrix and thus has to be large also. The use of a great number of light sources has the advantage of fast scan, but, on the other hand, when this number is forced to be too large, it makes the system very complicated for effective control. The size of mirror 48 determines its mass. This mass is one of the parameters which determines the frequency $\Omega_o$ at the resonator. For high value of $\Omega_o$ the mass of mirror 8 has to be small, which requires a small size of mirror 48. The combination of small mirror 48 and large number of light sources forces a very dense arrangement of the light sources array. Such an array of light source is very hard to achieve and one of the very few possible ways to obtain such an array of light sources is by an array of edge (surface) emitting diode lasers which are very expensive to produce and are not currently available commercially.

In many situations, the structure of the system is much simpler if the focusing lens (lenses) can be located between the light source (sources) and the scanning device. In this configuration, the distance between the focusing lenses and the focuses spots (focal length) is relatively large. For achieving a small focusing spot, the beam diameter has to be relatively large as indicated by the formula for the diffraction limit:

$$S=1.2\times\lambda\times f/d$$

where S is the focused spot size, $\lambda$ is the radiation wavelength, f is the focal length of the focusing lens and d is the beam diameter. A large diameter for the beams emitted from the light sources is inconsistent with the requirement of the system illustrated in FIG. 2 for a high density array of light sources. Thus, in the system of FIG. 2 the only possible location for the focusing lens (lenses) is between the scanning device (mirror) and the entrance matrix of bundle 58. This constraint does not allow one to gain the benefit of using simpler optics based on focusing lenses which are located between the light sources and the scanning device.

OBJECTS

Accordingly, it is an object of the present invention to provide scanning systems which are simple and which are free of scanning angle limitations, are vibration free and are easy to construct.

Another object is to provide a scanning system which consists of a converting bundle of optical fibers at whose entrance are arranged all the inputs of a the optical fibers along a cylindrical surface or part of cylindrical surface and which converts the arrangement at its exit into another arrangement, especially into array, matrix, ring and portion of a circle arrangements.

Another object is to scan the cylindrical surface which is formed by the inputs of the optical fibers in the entrance of the converting bundle by a rotating polygon for producing a scan at the output of the converter bundle, especially linear, matrix and circular scans.

Another object is to provide a rotating polygon which, regardless of the scanning angle, produces a scan which is linearly proportional to its scan position, maintains constant focusing conditions between the focusing lenses and the cylindrical surface of the converting bundle and maintains a constant angle between the scan orientation and the cylindrical surface in the entrance of the converting bundle.

Another object is to provide a rotating polygon which rotates with a continuous motion, free of speed limitations, having adjustable rotation speed, free of accelerations and vibrations, and produces scan without wobble.

Another object is to provide a scanning system which exhibits simultaneously both wide scanning range and high resolution.

Another object is to provide a scanning system which contains multiple light sources for high speed scanning and in which the number of the light sources is independent of the dimensions of the scanning range.

Another object is to provide a scanning system in which the multiple light sources can be located at different positions and orientations for reducing the dense arrangement of the light sources.

Another object is to provide a scanning system in which the dimensions of the scanning polygon are free of physical limitations.

Another object is to provide a scanning system in which the tolerances in the production of the polygon can be corrected by adjusting a static optical component.

Another object is to provide a scanning system in which the scanning device is produced from two rotating polygons which are integrated together.

Another object is to provide a scanning system in which the scanning optical path is separated from the optical path between the focusing lenses and the scanning device for avoiding disturbances and mixing between these two optical paths.

Another object is to provide a scanning system in which the focusing lenses are located between the light sources and the scanning polygon.

Another object is to provide an accurate scanning system for writing, printing, engraving, reading and inspection, where the light sources in the case of writing, printing and engraving are replaced by light sensitive devices in the case of reading and inspection.

Still further objects and advantages will become apparent from a consideration of the description and accompanying drawings.

SUMMARY

These and other objects are accomplished by using prefocused optics consisting of multiple arrays of light sources which emit multiple arrays of light beams which are converted by arrays of focusing lenses into arrays of focusing beams. The arrays of the focusing beams illuminate a unique scanning polygon which deflects the arrays of the focusing beams and produces internal cylindrical scanning while rotating around its axis. The deflected arrays of the focusing beams are focused into arrays of small focused spots on the scanned internal cylindrical surface and are coupled into the inputs of optical fibers which form the scanned internal cylindrical surface at the entrance of a bundle converter. The outputs of the optical fibers at the exit of the bundle converter produce scanning of surfaces by emitting the light which is coupled to their inputs at the entrance of this bundle toward the scanned surfaces when they are arranged in many possible shapes many of which can simultaneously exhibit a wide range and high resolution scanning.

The unique scanning polygon produces a complete, or partial internal cylindrical scanning which is linear to its scan position, having constant focusing conditions and maintaining a fixed relative angle between the scanning beams (deflected focusing beams) and the scanned surface (entrance of the bundle converter) for every scan position of the scanning polygon along every scanning angle which can be as large as desired.

Such scanning systems which are used for writing or printing can be converted into scanning systems for reading or inspecting by inverting the propagation direction of the light and having it propagate from the scanned surface through the exit of the bundle converter along the optical fibers to their inputs on the cylindrical surface at the entrance of the bundle converter. The light is emitted from the entrance of the bundle converter and illuminates the scanning polygon which deflects it toward static arrays of focusing lenses which focus the arrays of the deflected beams on arrays of light sensitive devices which replace the light sources used in scanning systems for printing or writing.

BRIEF DESCRIPTION OF THE DRAWINGS

The invention is herein described, by way of example only, with reference to accompanying drawings wherein:

FIG. 6 illustrates output arrangements of optical fibers at the exit of a bundle converter.

Figure 3:
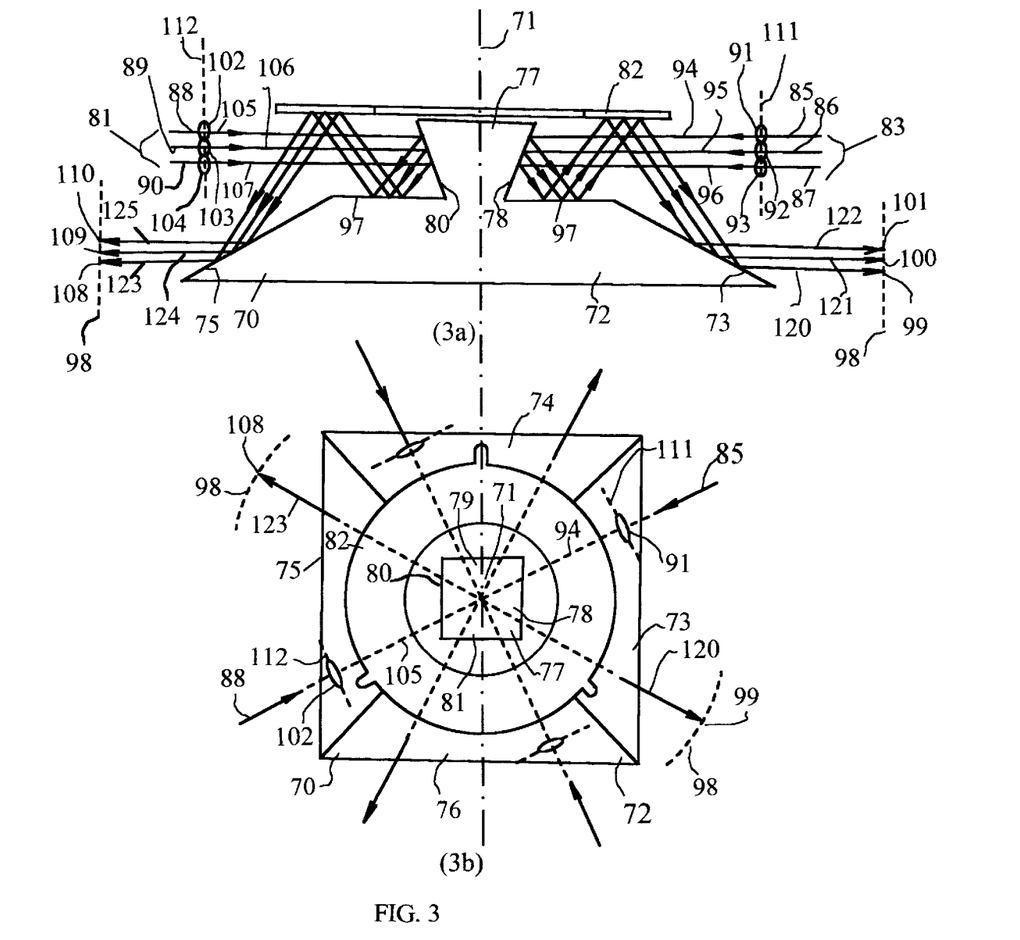
FIG. 3 illustrates cylindrical scanning system using multiple beams and rotating polygon.

FIG. 3 CYLINDRICAL SCANNING SYSTEM USING MULTIPLE BEAMS AND ROTATING POLYGON

FIG. 3 is provided as a preliminary aid in understanding the present invention and demonstrates the use of a rotating polygon to provide cylindrical scanning of multiple beams and depicts a side-view cross-section and top view of the scanning system. Part (*a*) of FIG. 3 illustrates a side view cross-section of the scanning system which consists of a four sided scanning polygon 70 which rotates around its axis of rotation 71.

Polygon 70 is constructed from three parts: the lower part 72 of the polygon having four facets 73–76 (only facets 73 and 75 are shown), the upper part 77 having four facets 78–81 which correspond to facets 73–76 of the lower part, respectively (only facets 78 and 80 are shown) and the static mirror 82 which is adjustable. Array of beams 83 which consists of beams 85–87 is converted by focusing lenses 91–93 into array of focusing beams 94–96, respectively. Focusing beams 94–96 are oriented toward facet 78 of polygon 70 and propagate via polygon 70 by multiple reflections from its reflecting planes 78, 97, 82 and 73. From facet 73 focusing beams 94–96 are reflected out of polygon 70 and propagate via polygon 70 as scanning beams 120–122 and are focused on cylindrical surface 98 into small spots 99–101, respectively. Similarly, array of beams 84 which consists of beams 88–90 is converted by focusing lenses 102–104 into array of focusing beams 105–107, respectively. Focusing beams 105–107 are aligned toward facet 80 of polygon 70 and propagate via polygon 70 by multiple reflections from its reflecting planes 80, 97, 82 and 75.

From facet 75 focusing beams 105–107 are reflected out of polygon 70 as scanning beams 123–125 and are focused on cylindrical surface 98 into small spots 108–110, respectively. Focusing lenses 91–93 have a common lens plane 111 which is parallel to rotational axis 71 of polygon 70. Focusing lenses 102–104 have a common lens plane 112 which is symmetric to plane 111 with respect to rotational axis 71. Axis of rotation 71 also serves as the central axis of cylindrical surface 98. The length of the optical path between lenses planes 111 and 112 to cylindrical surface 98 via polygon 70 equals the focal length of lenses 91–93 and 102–104. This optical length remains constant for every rotational position and for every facet of polygon 70. In this configuration the focusing conditions of spots 99–101 and 108–110 remain fixed for every rotational position of scanning polygon 70.

Part (*b*) of FIG. 3 is a top view of the scanning system shown in part (*a*) of the drawing where the system dimensions are reduced proportionally and the relative angle between polygon 70 and the optical beam and their focusing lenses has been changed to allow the separation (in a top view) between the incident beams which propagate toward polygon 70 and the scanning beams which are reflected out of polygon 70.

This part of the drawing demonstrates several important aspects concerning the polygon. It can be seen that the light beams can be coupled to scanning polygon 70 through all its facets, which means that array of beams like array 83 and 84 (in part (*a*) of FIG. 3) can be used for each of its facets. Incident beams, such as beam 85 and 88, are extended by broken lines which pass through rotational axis 71. Similarly scanning beams such as beams 120 and 123 are also extended by broken lines which pass through rotational axis 71. These broken lines do not indicate the actual optical paths of the beams via polygon 70; they only indicate the orientation of beams like incident beams 85, 88 and scanning beams like beams 120, 123. These orientations indicate that each side of scanning polygon 70 behaves effectively like a flat mirror which is mounted directly on rotational axis 71 with an additional vertical displacement. Polygon 70 and its properties are thoroughly discussed in the section corresponding to FIG. 16 of our above patent application. This polygon is one of many other versions which can be used according to the above mentioned patent application which satisfies all the objectives required of the scanning device of the scanning system as indicated before and some of whose most important properties regarding cylindrical scanning are respectively listed below and are valid for any rotational angle and position of the scanning polygon, namely: linear relationship between the scan speed and the rotational speed of the polygon, constant focusing conditions on the cylindrical surface, constant angle between the scanning beams and the scanned cylindrical surface, vertical displacement between the incident beams and the scanning beams and maintenance of all the above properties while using more than one scanning beam for more than one facet of the scanning polygon.

These properties make polygons like polygon 70 designed according to the above mentioned patent application an ideal scanning device for scanning systems which are used to couple multiple scanning beams along a wide range of scanning angles into the inputs of optical fibers which are arranged in a bundle structure having an entrance shape of a cylinder.

Figure 4:
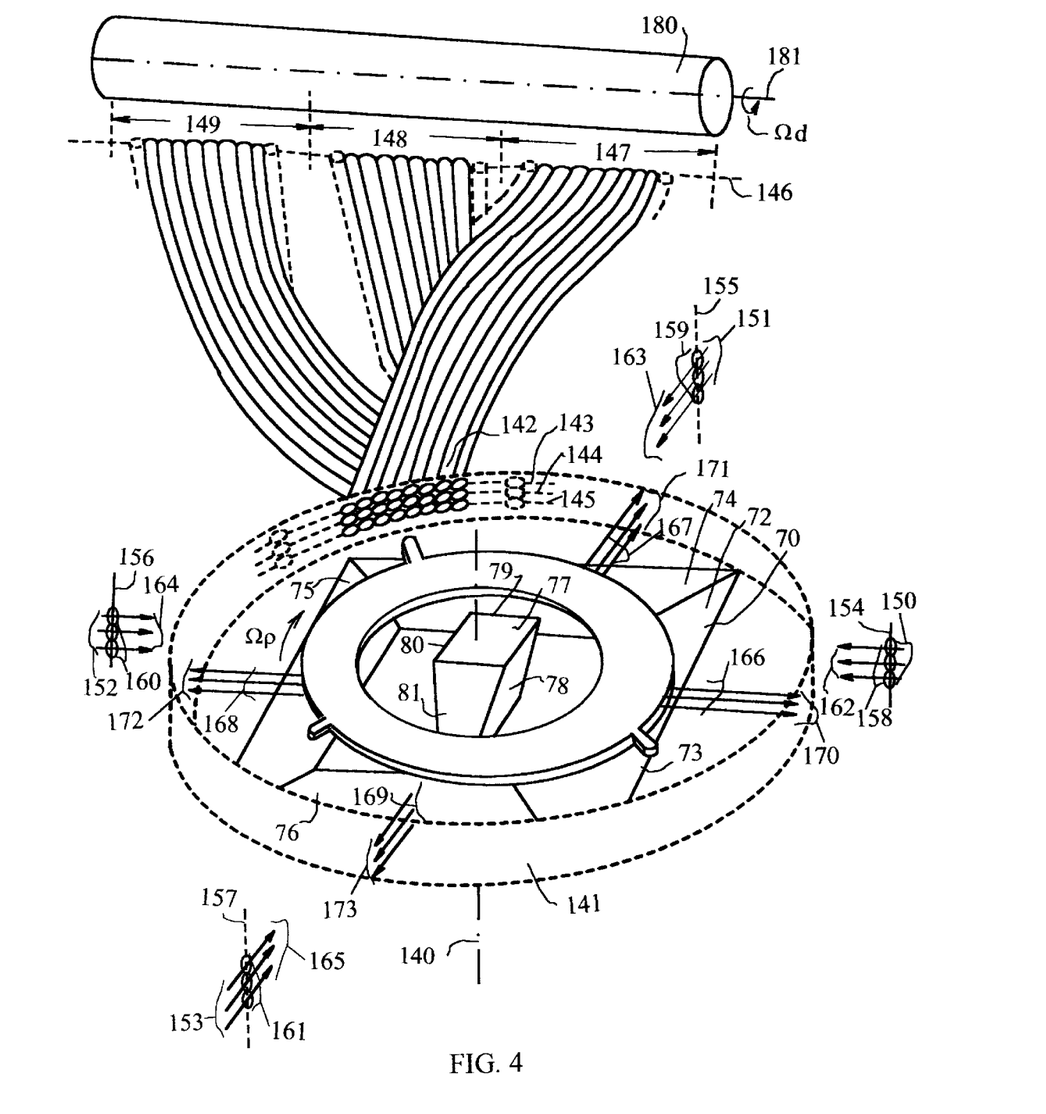
FIG. 4 illustrates scanning system with a cylindrical to linear converter of optical-fibers bundle.

FIG. 4 SCANNING SYSTEM WITH CYLINDRICAL TO LINEAR CONVERTER OF OPTICAL-FIBERS BUNDLE

FIG. 4 illustrates a scanning system which includes of scanning polygon 70 which rotates around its axis a rotation 140. Axis 140 serves also as the central axis of cylindrical surface 141. Cylindrical surface 141 is illustrated by broken lines to indicate that this surface is a virtual surface which is produced by the inputs of the optical fibers of bundle 142 which are arranged in its entrance in a cylindrical shape which is marked as virtual cylindrical surface 141.

The inputs of the optical fibers in the entrance of bundle 142 can be arranged to form a complete cylindrical surface 141 by a series of complete circles or to form part of complete cylindrical surface 141 by a series of arcs which are part of complete circles. For simplicity of the drawing, the inputs of the optical fibers in the entrance of bundle 142 are illustrated only along a small fraction of surface 141 and are arranged along circles (arcs) 143–145. Circles 143–145 are virtual and are illustrated by broken lines. Several inputs of the optical fibers are illustrated in broken lines along broken lines 143–145 for indicating that the inputs of the optical fibers cover a bigger or smaller fraction of surface 141 than illustrated.

Bundle 142 transforms the arrangements of the inputs of the optical fibers in its entrance from circles (or arcs) along surface 141 into a linear shape where all the outputs of the optical fibers in its exit are arranged along line 146. In this type of conversion, every scan along circles or arcs in the entrance of bundle 142 (surface 141) is transformed into linear scan along line 146 at the exit of bundle 142. For example, in such a configuration, the cylindrical scan along arcs 143–145 is converted into a linear scan along intervals 147–149. Line 146, or part of it, consists of such intervals.

The outputs of the optical fibers in the exit of bundle 142 which are aligned along line 146 are illustrated along part of line 146 and some of them are drawn in broken lines to indicate that the intervals such as intervals 147–149 can be wider or narrower than illustrated and that the outputs of the fibers can be arranged all along their width or along part of it. Multiple optical parallel beams are coupled to scanning polygon 70 at its four facets 78–81 of its upper part 77 after being converted to focusing beams by focusing lenses.

At any time each of the facets of polygon 70 is illuminated by one of the arrays of beams 150–153. Arrays of beams 150–153 consist of multiple parallel beams which are converted into arrays 162–165 of focusing beams by arrays 158–161 of focusing lenses that are located at lens planes 154–157, respectively. Arrays 162–165 of focusing beams are oriented to facets 78–81 of upper part 77 of polygon 70. Upper part 77 of polygon 70 and arrays 162–165 of focusing beams are all located above cylindrical surface 141 in a configuration wherein all the beams that are launched toward facets 78–81 can propagate toward scanning polygon 70 without any blocking or any optical disturbances.

Focusing beams of arrays 162–165 propagate via polygon 70 after hitting facets 78–81, respectively, by multiple reflections from the reflecting surfaces of polygon 70 in a similar way as illustrated in part (*a*) of FIG. 3. Arrays of focusing beams 162–165 are reflected out of polygon 70 from facets 73–76 of lower part 72 of polygon 70 as arrays 166–169 of scanning beams which are focused on surface 141 into arrays 170–173 of small focused spots, respectively. For simplicity of the drawing, all the optical beams are illustrated only by their chief (prime) ray and, in addition, only the initial parts of the beams which are launched toward polygon 70 are shown and also only the scanning beams which are reflected out of polygon 70 are illustrated while the optical path of the beams via polygon 70 is not shown but it is demonstrated in part (*a*) of FIG. 3.

In this configuration when the launched beams hit the upper part 77 of polygon 70 above surface 141 and the scanning beams are focused on surface 141, the scan can be performed all around the cylindrical surface 141 or along part of it (as desired) without any blocking or interfering between the incident and the scanning beams.

In many versions of polygons like polygon 70 which are designed as described in our above parent application, the relative tilted angle between the facets of the upper part of the polygon (such as facets 78–81) and their corresponding facets of the lower part of the polygon (such as facets 73–76), equals 90°. In such designs, the polygons have all the properties which are listed above with the additional property that each of their sides behaves like a retro-reflector and thus, the unwanted phenomena of wobble and bowed scan which exist in conventional polygons are eliminated. When scanning polygon 70 rotates around its rotational axis 140 with angular velocity $\Omega_p$ each focused spot in the arrays 170–173 of focused small spots on surface 141 changes its position and moves along arcs such as arcs 143–145 and its position corresponds linearly to the scan position of polygon 70. Each spot in a certain array (one of arrays 170–173) scans a different arc (such as arcs 143–145) which are formed by the inputs of the optical fibers in the entrance of bundle 142.

During such scan, the light radiation is coupled alternatively into the inputs of the optical fibers which are spread along the scanned arcs on surface 141. The different scanned arcs which are formed separately by arrays 170–173 of focused spots which change their position according to the scanned position of polygon 70 can be joined together to create multiples of complete scanned circles for scanning over the entire cylindrical surface 141.

The light radiation which is coupled alternatively into the inputs of the optical fibers in at the entrance of bundle 142 during the scan along the different arcs, such as arcs 143–145, is converted by bundle 142 into radiation light which is emitted alternatively from the outputs of the optical fibers at the exit of bundle 142 for producing linear scan along linear intervals corresponding to the different scanned arcs at the entrance of bundle 142. The various linear intervals of the exit of bundle 142 can be joined together for producing a linear scan over a very wide range along line 146.

Drum 180 is mounted on its rotational axis 181 and rotates around it with angular velocity $\Omega_d$. The distance diversion of the light which is emitted from the outputs array of the optical fibers and illuminates the drum is negligible. The combination of the linear scan which is produced by the output of the optical fibers at the exit of bundle 142 with the rotational motion of drum 180 produces scanning all the entire surface of drum 180. In this configuration a high resolution scan can be produced along a very wide scanning range. A large variety of surfaces can be scanned by such a scanning system when the drum is replaced by the scanned surfaces which move across the scanning orientation along line 146. The scanning system as illustrated in FIG. 4 operates as a printing or writing system in a configuration where the light radiation is emitted from light sources and is launched toward scanning polygon via focusing system and is reflected from the scanning polygon through optical fibers for printing or writing on a scanned surface. It is obvious that such a scanning system can operate as an inspecting or reading system when the light radiation propagates in the opposite direction in a configuration wherein the light radiation is reflected from the scanned (inspected) surface through optical fibers toward the scanning polygon and is collected by focusing lenses for producing the image (images) of the area (areas) of the inspected (scanned) surface on light sensitive devices (device) which replace the light sources (which are used in the writing configuration). The following discussion demonstrates that all the disadvantages and the limitations which exist in the scanning system illustrated in FIG. 2, as indicated in the section of the prior art, are eliminated in the scanning system illustrated in FIG. 4 which is designed according to the present invention. The comparison between these two systems is done for the following aspects.

Scanning Angle at the Entrance of the Optical Fibers of a Bundle:

In the system of FIG. 2, this angle is very small (about 6°) because its upper value is determined as the maximum angle between the scanning beam and the axis of a the optical fibers. Since the use of conventional polygon for scanning device is impractical (too many facets) it is necessary to use a scanning mirror which is driven by a resonator which has a very small amplitude of rotation. This amplitude is even smaller than the upper limit mentioned above. In addition, only a small part on rotation angle of the resonator can be used for scanning the one which has a linear relationship between its value and the scan time, resulting in a very small scanning angle.

In the system of FIG. 4, the relative angle between scanning beam and the axis of the fiber, the focusing conditions, and the linear relationship between the scan angle and the position of the scanning beam on the scanning line are all fixed and are independent of the scanning angle. In this situation, the only limitation on the scanning angle is the number of facets which the scanning polygon has, which results in the achievement of very large scanning angles.

Vibrations Which Are Introduced to the Scanning System By the Scanning Device:

In the system of FIG. 2, the scanning mirror that is driven by the resonator rotates back and forth. This motion, which contains change of scan directions, produces vibrations which disturb the operation of the scanning system.

In the system of FIG. 4, the scanning polygon has a continuous and smooth motion which does not introduce any vibration to the scanning system.

Adjustable Scanning Speed:

In the scanning system of FIG. 2, the scan speed is determined by the self resonance frequency of the resonator $\Omega_o$. Operation of the resonator in any other frequency which differs from $\Omega_o$ will cause a dramatic increase of the vibration to the scanning system and will not allow proper operation of the scanning system.

In the scanning system of FIG. 4, such limitation does not exist and the scanning polygon can be rotated at a large variety of scanning speeds as desired. The upper scanning speed is determined only by the power of the motor which drives the polygon and by the polygon mass and its aerodynamic properties.

Linear Relationship Between the Position of the Scanning Device And the Scan-Time:

In the scanning system of FIG. 2, the back and forth rotation of the scanning mirrors requires changes of the scan directions and causes accelerations in the ranges of the turning points where the scan direction is changed. The regions with the accelerations do not have a linear relationship between the position of the scanning device and the scan time, and only a small fraction of the scan angle has such a relationship and can be used for the scan.

In the scanning system of FIG. 4, the linear relationship between the position of the scanning device and the scan time exists all over the scanned region due to the fixed and continuous rotation of the polygon. In addition, there is also linear relationship between the scan position of the scanning polygon and the scan position of the scanning beam which does not exist in conventional polygons.

Usage Of Multiple Arrays of Light Sources (Or Light-Sensitive Devices):

The system of FIG. 2 has one scanning mirror. Thus, it is capable of scanning with only one array of light sources (for writing) or one array of light sensitive devices (for inspection).

The system of FIG. 4 can be operated when using multiple arrays in a configuration where each array is coupled to each facet of the scanning polygon. The use of multiple arrays make it possible to reduce the density of the sources (detectors) in each array (the simpler structure) while maintaining the same scanning speed as in the system of FIG. 2 or alternatively maintaining the same sources (detectors) density in the arrays as it is in the system of FIG. 2 while increasing the scan speed by the number of the arrays which are used.

Simple Optics:

The use of the focusing lenses in a configuration where these lenses are located between the light sources (detectors) and the scanning device has the following advantages with comparison to the configuration where these lenses are located in between the scanning device and the scanned surface (entrance of the optical fibers bundle): simpler structure and constant optical conditions due to the static position of the optical beams that are launched to (from) the scanning device.

However, the use of focusing lenses before the scanning device requires longer focal length (the distance between the lenses via the scanning device to the scanned surface). In this situation, for maintaining the same size of the focused spot on the scanned surface, the optical beam diameter should be larger, resulting in a bigger scanning device.

In the system of FIG. 2, the size of the scanning mirror is not chosen arbitrarily since its size determines its mass and this mass has to match the self resonance frequency $\Omega_o$ of the resonator. In addition, it is very hard and expensive to get resonators with high $\Omega_o$ which can drive a scanning mirror that has a relative big mass. For these reasons, the system of FIG. 2 does not have the focusing lenses before the scanning mirrors and they are located between the scanning mirror and the scanned surface (entrance of the optical fibers bundle).

In the system of FIG. 4, there is no problem in using large size scanning polygons for the scanning system and thus the focusing lenses can be located before the scanning polygon, resulting in gaining the above advantages of this configuration.

Figure 5:
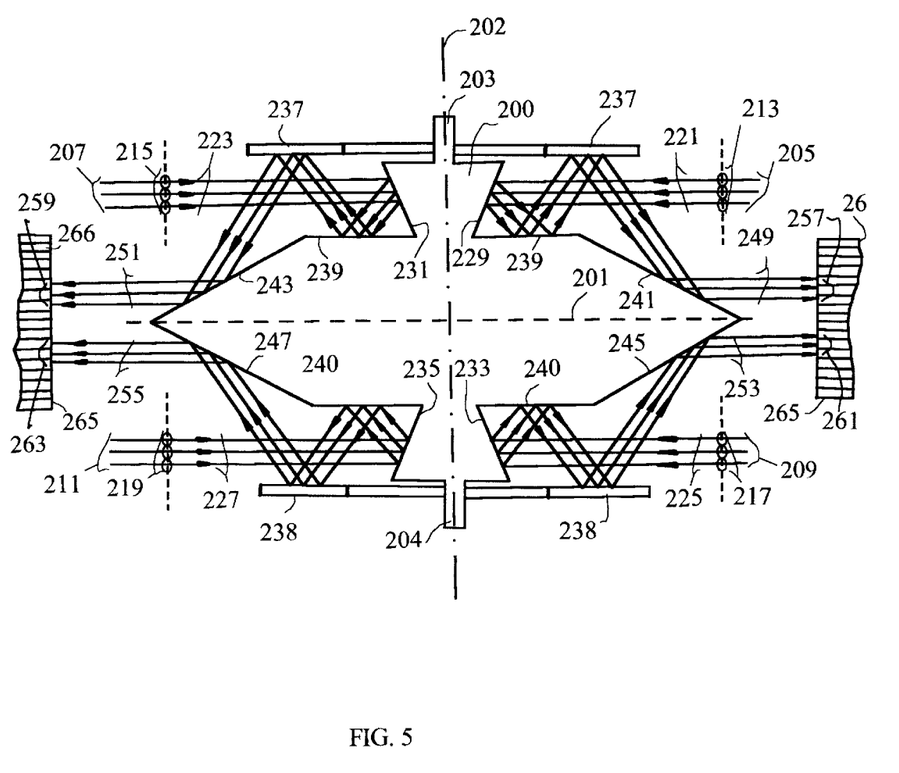
FIG. 5 shows integrated scanning polygon.

FIG. 5 INTEGRATED SCANNING POLYGON

FIG. 5 illustrates a side view cross-section of an integrated scanning polygon 200 which comprises of two polygons like polygon 70 in FIG. 3 in a configuration wherein they are joined together in a symmetric structure with respect to the symmetry line 201. Polygon 200 has four sides and another symmetry axis 202 which also serves as the rotational axis of polygon 200. Polygon 200 has two mounting axes 203 and 204 which serve as rotational axes. Eight arrays of parallel optical beams 205–212 (only arrays 205, 207, 209 and 211 are shown) which are located out of the scanned cylindrical surface 265 are converted by arrays of focusing lenses 213–220 (only arrays 213, 215, 217 and 219 are shown) into arrays of focusing beams 221–228 (only arrays of focusing beams 221, 223, 225 and 227 are shown). Each of the arrays of focusing beams 221–224 illuminates one of the facets 229–232 of polygon 200 (only facets 229 and 231 are shown.

Similarly, each of the arrays of focusing beams 225–228 illuminates one of the facets 233–236 (only facets 223 and 235 are shown). Mirrors 237 and 238 are adjusting mirrors used to compensate for production tolerances and are at a static position when polygon 200 rotates around its axis 202. Each of the arrays of the focusing beams 221–224 is reflected out of polygon 200 from one of facets 241–244 (only facets 241 and 243 are shown) and serves as an array of scanning beams. Each of the arrays of focusing beams 225–228 is reflected out of polygon 200 from one of the facets 245–248 (only facets 245 and 247 are shown) and serves as an array of scanning beams. Arrays of focusing beams 221–224 propagate via polygon 200 by multiple reflections from the reflecting surfaces of polygon 200 along one of the following optical paths which are defined by the number of the reflecting surfaces of polygon 200 (229, 239, 237, 241), (230, 239, 237, 242), (231, 239, 237, 243) or (232, 239, 237, 244).

Similarly arrays of focusing beams 225–228 propagate via polygon 200 by multiple reflections form the reflecting surfaces of polygon 200 along one of the following optical paths which are defined by the number of the reflecting surfaces of polygon 200 (233, 240, 238, 245), (234, 240, 238, 246), (235, 240, 238, 247) or (236, 240, 238, 248).

Arrays of focusing beams 221–228 are reflected out of polygon 200 by one of the facets 241–248 as arrays of scanning beams 249–256, respectively (only arrays of scanning beams 249, 251, 253 and 255 are shown). Arrays of scanning beams 249–256 are focused into arrays of small focused spots 257–264 (only arrays of focused sports 257, 259, 261 and 263 are shown) on cylindrical surface 265. Rotational axis 202 also serves as the central axis of cylindrical surface 265 on which all the inputs of the optical fibers of bundle 266 are located. When scanning polygon 200 rotates around its axis 202, the light radiation of arrays of focused spots 257–264 scan the surface 265 along arcs. These arrays of focused spots are coupled alternatively into the inputs of the optical fibers of bundle 266 to produce another type of scanning at the exit of the bundle according to the conversion type of bundle 266. In the version of scanning polygon 200 there is no interfering between the incident optical beams which are launched toward the polygon and the scanning beams which are reflected out of the polygon. Thus this polygon is capable of scanning a complete cylindrical surface (or part of it) without any disturbances. The main advantage of the version of polygon 200 with respect to the version of polygon 70 (illustrated in FIG. 3) is the ability to double the number of the arrays of beams which are coupled to the polygon facets while keeping the same number of the polygon sides.

FIG. 6 OUTPUT ARRANGEMENT OF THE OPTICAL FIBERS AT THE EXIT OF THE BUNDLE CONVERTER

FIG. 6 illustrates several examples of arrangements of the optical fibers at the exit of the bundle converter which are given for demonstrating the large varieties of such arrangements. For all the arrangements given as examples in parts (*a*)–(*e*) of FIG. 6, or any other arrangements of outputs of optical fibers at the exit of a bundle, the arrangement of the inputs of the optical fibers at its entrance is always in the shape of a cylindrical surface like surface 141 in FIG. 4. All the shapes of the exits of the optical fiber bundle are illustrated in parts (*a*)–(*e*) of FIG. 6 by broken lines for indicating that these shapes are virtual and are formed by the outputs of the optical fibers which are positioned along these virtual shapes. In addition, the broken lines also indicate that there are many more courses like these which are not indicated on the drawing, for the simplicity of the drawing, along which the fibers are positioned. In all the parts of FIG. 6 only a small fraction of the amount of output fibers is illustrated in broken lines which indicates that actually they can cover the whole shape or part of it which may be bigger or smaller than illustrated.

Part (*a*) of FIG. 6 illustrates a bundle exit in a shape of line (vector) 300. Line 300 consists of intervals such as 301–304 on which the output of the fibers are located. The boundaries between the intervals are illustrated by broken lines 305–309. Each arc in the entrance of the converting bundle is converted into one of the intervals at the exit of the bundles (such as intervals 301–304). Line 300 consists of, in this situation, the internal cylindrical scanning of the arcs at the entrance of the bundle which is converted into linear scanning of intervals that are joined together for creating line 300. The scan direction of the interval can be done from left to right as illustrated by arrows 310 and 311 in intervals 301–303 respectively. Alternatively, the scan can be done from right to left as illustrated by arrows 312 and 314 in intervals 302 and 304 respectively.

Part (*b*) of FIG. 6 illustrates an exit of bundle converter when the outputs of the fiber-optics are arranged in a shape of matrix 350. Matrix 350 is produced by many lines one above the other, which are illustrated by broken lines 351–353. These lines, which are represented by broken lines 351–353, are similar to line 300 in part (*a*) of FIG. 6. Each of these lines is formed by intervals such as intervals 354–365. The boundaries between the intervals are marked by broken lines, such as broken lines 366–370. Matrix 350 is built up from sub-matrices such as the sub matrix 371 defined between lines 351, 352, 367 and 368. The lines and the column of matrix 350 or any sub matrix, such as sub matrix 371, are switchable and thus the scan of the bundle exit can be done laterally (from left to right or the opposite) as indicated by arrow 372, or vertically (from up to down or the opposite) as indicated by arrow 373 or any combination of these possibilities. In this situation, the cylindrical scanning of the arcs is converted to a linear scan of intervals which are parts of lines or columns in matrix 350.

Part (*c*) of FIG. 6 demonstrates an example wherein the outputs of the optical fibers in the exit of the bundle are arranged along concentric circles like circles (arcs) 400 and 401 and cover the area of a whole circle 402 or part of it. In this situation the cylindrical scanning of the arcs in the entrance of the bundle is converted into circular scan of circles (or arcs) as illustrated by arrow 403. Alternatively, the scanning at the bundle exit can be done along the radial direction as indicated by arrow 404.

Part (*d*) of FIG. 6 illustrates a specific case of the shape illustrated in part (*c*) of the same figure where only part of the circle is used to produce a ring shape. Thus, the discussion above for part (*c*) is also valid for part (*d*) of the drawing when circles (arcs) 410 and 411 and circle 412 and arrows 413 and 414 in part (*d*) of the drawing are analogous to circles (arcs) 400 and 401 and circle 412 and arrows 403 and 404, respectively.

Part (*e*) of FIG. 6 illustrates a cylindrical-like shape 420 which consists of arcs (circles) like circles 421 and 422 along which the outputs of the optical fibers are arranged and are joined together to cover the whole surface of cylinder 420 or part of it. The scan at the exit of the bundle can be done along the arcs (circles) as indicated by arrow 423 or can be vertically done as indicated by arrow 424. Thus, the internal cylindrical scanning along the arcs in the entrance of the bundle is converted to external cylindrical scanning along arcs (circles) or linearly vertical, respectively.

The examples which are discussed above and which are illustrated in FIG. 6 demonstrate only part of the large variety of shapes, directions of scanning and their combinations which can be used in at the exit of the optical fibers bundle converter.

SUMMARY AND SCOPE

Though most of the drawings and their accompanying discussion are related to scanning systems for writing and printing, it is clear that such scanning systems can be easily converted into scanning systems for reading and inspection by inverting the direction of the light propagation to be from the scanned surface via the optical fibers, the scanning polygon and the arrays of focusing lenses to the arrays of light sensitive detectors (such as CCD cameras) which replace the arrays of the light sources used for the writing versions.

While the invention has been described with respect to a limited number of embodiments, it will be appreciated that many variations, modifications and other applications of the invention may be made. Thus the scope of the invention should be determined by the appended claims and their legal equivalents and not by the examples given.

What is claimed is:

1. A system for scanning, tracking, engraving printing, plotting, writing, inspecting, or reading, comprising:
   (a) a polygon means which can rotate about a rotational axis throughout a range of rotation with an angular velocity,
   (b) said polygon means comprising a polygon having at least one side, said one side including at least one optical means,
   (c) a first region and a second region remote from said first region,
   (d) a first medium support means and a first medium having a bundle of radiation guides, said first medium support means supporting said first medium,
   (e) each of said rotation guides having a first end and a second end, said first end being located at said first region and said second end being located at said second region, (f) a second medium support means and a second medium having a third region, said second medium support means supporting said second medium, (g) a radiation source means for providing at least one radiation beam and directing said one radiation beam onto said optical means of said polygon means such that said one radiation beam travels to said optical means of said polygon means, (h) said optical means arranged to project said at least one radiation beam from said optical means onto said first region so as to form, on said first region, a corresponding radiation spot which moves on said first region at a second velocity which is linearly proportional to said angular velocity of said polygon means throughout said range of rotation of said Polygon means, (i) said optical means also arranged to receive said one radiation beam from said radiation source along a first line and to project said one radiation beam onto said first region along a second line, such that said first and second lines intersect a plane that contains said rotational axis at two intersection points that are separated along said plane in the direction of said rotational axis, (j) said first region being positioned to receive said one radiation beam from said optical means of said polygon means, such that said one radiation beam travels along an optical path from said radiation source means to said optical means, and then from said optical means to said radiation guides on said first region, (k) said bundle of radiation guides being arranged to receive said one radiation beam from said first region and to guide said one radiation beam to said second region, (l) said third region being positioned to receive said one radiation beam from said second region, and (m) said radiation source means and said first and second medium support means and hence said first, second, and third regions being positioned so that they are spaced from said rotational axis and are spaced from each other.

2. The system of claim 1 wherein said radiation source means is arranged to cause said second velocity to be twice said angular velocity times the distance between said rotational axis and said first region.

3. The system of claim 1, further including, adjacent said polygon means, at least one non-rotating facet whose position and orientation are adjustable, said facet being oriented perpendicularly to said rotational axis of said polygon.

4. The system of claim 3 wherein said facet includes a mirror.

5. The system of claim 1 wherein said polygon has multiple sides and said radiation source means is arranged to direct a plurality of radiation beams toward at least one of said sides of said polygon.

6. The system of claim 1 wherein said radiation source means comprises a plurality of radiation sources.

7. The system of claim 1 wherein said first medium support means is also arranged to maintain said second velocity equal to said angular velocity times the distance between said rotational axis and said first region.

8. The system of claim 1 wherein said radiation source is arranged to direct at least one radiation beam so that said beam forms a spot focussed on said first region.

9. The system of claim 1 wherein said third region is a printer drum.

10. A system for scanning, tracking, engraving, printing, plotting, writing, inspecting, or reading, comprising:

(a) a polygon means which can rotate about a rotational axis throughout a range of rotation with an angular velocity, (b) said polygon means comprising a polygon having at least one side, said side including at least one optical means, (c) a first region and a second region remote from said first region;

(d) a first medium support means and first medium having a bundle of radiation guides, said first medium support means supporting said first medium, each of said guides having a first and a second end, said first end being located at said first region and said second end being located at said second region;

(e) a second medium support means and a second medium having a third region, said second medium support means supporting said second medium, (f) said third region being arranged to provide at least one radiation beam from said third region and direct said one radiation beam to said second region;

(g) said bundle of radiation guides being arranged to receive said one radiation beam frown said third region and to guide said one radiation beam from said second region to said first region;

(h) a photosensitive detector means;

(i) said optical means arranged to form, on said first region, a field of view which moves on said first region at a second velocity which is linearly proportional to said angular velocity of said polygon means throughout said range of rotation of said polygon means;

(j) said first region being arranged to cause said field of view thereon to emit said one radiation beam and direct said one radiation beam to said optical means;

(k) said optical means arranged to receive said one radiation beam from said field of view on said first region and then to project said one radiation beam in a fixed orientation throughout the rotation of said polygon means to said photosensitive detector means;

(l) said photosensitive detector means being positioned to receive said one radiation beam from said optical means of said polygon means, such that said one radiation beam travels along an optical path from said field of view on said first region to said optical means, and than from said optical means to said photosensitive detector means;

(m) said optical means also arranged to receive said one radiation beam from said field of view on said first region along a first line and to project said one radiation beam in a fixed orientation onto said photosensitive detector means along a second line, such that said first and second lines intersect a plane that contains said rotational axis at two intersection points that are separated along said plane in the direction of said rotational axis, (n) said radiation source means and said first and second medium support and hence said first, second and third regions being positioned so that they are spaced from said rotational axis and are spaced from each other.

11. The system of claim 10 wherein said first medium support means is also arranged to maintain said second velocity at twice said angular velocity times the distance between said rotational axis and said first region.

12. The system of claim 10 wherein said first region is at least in part circular.

13. The system of claim 10 wherein said second ends of said guides form a linear array.

14. The system of claim 10 wherein said second ends of said guides form a matrix.

15. The system of claim 10 wherein said second ends of said guides form at least a portion of a cylinder.

16. The system of claim 10 wherein said second ends of said guides form a ring.

17. The system of claim 10 wherein said first medium support means is also arranged to maintain said second velocity equal to said angular velocity times the distance between said rotational axis and said first region.

18. The system of claim 10 wherein said photosensitive detector means is positioned to collect a plurality of radiation beams from at least said one side of said polygon.

19. The system of claim 10 wherein said photosensitive detector means is positioned to collect said multiple radiation beams so that said beams forms a plurality of focussed spots upon said photosensitive detector.

20. A method of scanning, tracking, engraving, printing, plotting, writing, inspecting, or reading, comprising:

(a) providing a polygon means which can rotate about a rotational axis throughout a range of rotation with an angular velocity, said polygon means comprising a polygon having at least one side, said one side including at least one optical means, (b) providing a first region and a second region remote from said first region, (c) providing a first medium support means and a first medium having bundle of radiation guides, said first medium support means supporting said first medium, each of said radiation guides having a first end and a second end, said first end being located at said first region and said second end being located at said second region, (d) providing a second medium support means which provides a second medium having a third region, said third region being arranged to provide at least one radiation beam from said third region and direct said one radiation beam to said second region, (e) positioning said bundle of radiation guides to receive said one radiation beam from said third region and to guide said one radiation beam from said second region to said first region, (f) providing a photosensitive detector means, (g) causing said optical means to form, on said first region, a field of view which moves on said first region at a velocity linearly proportional to said angular velocity of said polygon means throughout said range of rotation of said polygon means, (h) causing said first region to emit, from said field of view thereon, said one radiation beam and direct said one radiation beam to said optical means, (i) positioning said optical means to receive said one radiation beam from said field of view on said first region along a first line and then to project said one radiation beam in a fixed orientation throughout the rotation of said polygon means onto said photosensitive detector means along a second line, such that said first and second lines intersect a plane that contains said rotational axis at two intersection points that are separated along said plane in the direction of said rotational axis, (j) positioning said photosensitive detector means to receive said one radiation beam from said optical means of said polygon means, such that said one radiation beam travels along an optical path from said field of view on said first region to said optical means, and then from said optical means to said photosensitive detector means, and (k) positioning said photosensitive detector means and said first and second medium support means and hence said first, second and third regions so that they are spaced from said rotational axis and are spaced from each other.

* * * * *

UNITED STATES PATENT AND TRADEMARK OFFICE
CERTIFICATE OF CORRECTION

PATENT NO. : 5,828,483
DATED : Oct 27, 1998
INVENTOR(S) : N. Schwartz et al

It is certified that error appears in the above-identified patent and that said Letters Patent is hereby corrected as shown below:

Col. 6, line 44, after "illustrates" insert —a—.

Col. 8, line 19, change "of" to —a—.
Col. 8, line 20, change "a" to —of—.

Signed and Sealed this

Fifteenth Day of June, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO.: 5,828,483
DATED: Oct 27, 1998
PATENTEES: N. Schwartz et al

It is certified that error appears in the above-identified patent and that said Letters Patent is hereby corrected as shown below:

Col. 1, line 54, change "lenses-system" to —lens-system—.

Signed and Sealed this

Twenty-seventh Day of March, 2001

*Attest:*

NICHOLAS P. GODICI

*Attesting Officer*   Acting Director of the United States Patent and Trademark Office